(12) United States Patent
Rud et al.

(10) Patent No.: US 12,135,105 B2
(45) Date of Patent: Nov. 5, 2024

(54) RELEASABLE PORT CONNECTION ASSEMBLY

(71) Applicant: KA Group AG, Zürich (CH)

(72) Inventors: Henning Rud, Lillehammer (NO);
Odvar William Lundby, Hunndalen (NO); Alf Greve Monsen, Raufoss (NO); Ali Khajehgani, Hunndalen (NO)

(73) Assignee: KA Group AG, Zurich (CH)

( * ) Notice: Subject to any disclaimer, the term of this patent is extended or adjusted under 35 U.S.C. 154(b) by 0 days.

(21) Appl. No.: 18/687,000

(22) PCT Filed: Jan. 19, 2022

(86) PCT No.: PCT/EP2022/051074
§ 371 (c)(1),
(2) Date: Feb. 27, 2024

(87) PCT Pub. No.: WO2023/138760
PCT Pub. Date: Jul. 27, 2023

(65) Prior Publication Data
US 2024/0271730 A1 Aug. 15, 2024

(51) Int. Cl.
*F16L 37/088* (2006.01)
*F16L 43/00* (2006.01)

(52) U.S. Cl.
CPC ........... *F16L 37/088* (2013.01); *F16L 43/008* (2013.01)

(58) Field of Classification Search
CPC ......... F16L 37/02; F16L 37/025; F16L 37/04; F16L 37/084; F16L 37/0844;
(Continued)

(56) References Cited

U.S. PATENT DOCUMENTS

| 4,240,654 A | 12/1980 | Gladieux |
| 6,343,814 B1 | 2/2002 | Bucher et al. |

(Continued)

FOREIGN PATENT DOCUMENTS

| DE | 19932307 A1 | 1/2001 |
| EP | 0226689 A1 | 7/1987 |
| WO | 2016041603 A1 | 3/2016 |

OTHER PUBLICATIONS

International Search Report and Written Opinion of the International Searching Authority for PCT International Application No. PCT/EP2022/051074 mailed Jul. 18, 2022.

*Primary Examiner* — Aaron M Dunwoody
(74) *Attorney, Agent, or Firm* — Howard & Howard Attorneys PLLC (57) ABSTRACT

A releasable port connection assembly comprises a female port member having a tubular passageway extending in an axial direction, a male connector having a tube connection end for connecting a tube to it, and a port connection end configured to be received and retained in the tubular passageway by a retaining pawl arrangement configured to engage an outwardly projecting locking shoulder on the port connection end of the male connector once the male connector has been inserted into the tubular passageway and its locking shoulder has passed the protrusion, characterized in that the protrusion is formed as a circumferentially extending inner rim of an elastically deformable split ring which is slidably received between sidewalls of a circumferential groove formed in an inner wall of the tubular passageway.

9 Claims, 5 Drawing Sheets

(58) Field of Classification Search
CPC ... F16L 37/088; F16L 37/0887; F16L 37/098; F16L 37/0982; F16L 37/12; F16L 37/123
See application file for complete search history.

(56) References Cited

U.S. PATENT DOCUMENTS

| | | |
|---|---|---|
| 2004/0103946 A1 | 6/2004 | Nanni et al. |
| 2017/0050197 A1* | 2/2017 | Huffington ............... B05B 9/01 |
| 2019/0360624 A1 | 11/2019 | Waller |

* cited by examiner

RELEASABLE PORT CONNECTION ASSEMBLY

CROSS-REFERENCE TO RELATED APPLICATIONS

This application claims priority under 35 U.S.C. § 371 to International Application No. PCT/EP2022/051074, filed Jan. 19, 2022, which is incorporated herewith by reference in its entirety.

FIELD OF DISCLOSURE

The present invention is directed to a releasable port connection assembly comprising: a female port member having a tubular passageway extending in an axial direction, a male connector having a tube connection end and a port connection end, the tube connection end being configured for connecting a tube to it, and the port connection end being configured to be received and retained in the tubular passageway by a retaining pawl arrangement comprising an elastically displaceable protrusion extending radially inwardly in the tubular passageway and configured to engage an outwardly projecting locking shoulder on the port connection end of the male connector once the male connector has been inserted into the tubular passageway and its shoulder has passed the protrusion.

BACKGROUND AND SUMMARY OF DISCLOSURE

A releasable port connection assembly of this kind is disclosed in US 2019/0360624 A1. Port connection assemblies are typically used as quick connecting assemblies which allow a male connector to be connected to a female port member by plug-in connection. The male connector part is a conduit having a tube connection end and a port connection end, wherein the tube connection end is configured to connect a tube to it, and the port connection end is configured to be received and retained in a tubular passageway of the female port member by a retaining pawl arrangement. The retaining pawl arrangement comprises an elastically displaceable protrusion which extends radially inwardly into the tubular passageway and which is configured to engage an outwardly projecting shoulder on the connection end of the male connector once the male connector has been inserted into the tubular passageway and its shoulder has displaced the protrusion to allow the shoulder to pass, whereafter the elastically displaceable protrusion returns back to engage the shoulder on its backside, whereby the male connector is locked in the tubular passageway of the female port member by a plug-in connection. The tube connection end of the male connector may have a so called fir-tree structure on its surface which is adapted to hold a tube by the fir-tree structure on the outer wall of the conduit of the male connector. Alternatively, the tube connection end can be configured as a push-in tube connector port which allows to push in a tube into a conduit male connector which functions at its tube connection end as a female port, wherein the introduced tube is gripped and retained within the conduit of the tube connection end. Such push-in tube connector configuration of the tube connecting end is for example described in WO 2016/041603 A1.

Port connection assemblies of the type described in the present invention are in widespread use in the automotive industry in applications where hoses or tubes have to be connected via male connectors to female port members by plug-in connection in pressurized fluid systems, such as hydraulic or pneumatic systems in automotives.

Many of the prior art port connection assemblies suffer from the drawback that the male connector cannot be released from the female port without damaging it and thus preventing re-use of the male connector. In many other cases a nut forming part of the female port housing has to be unscrewed and removed for disconnecting the male connector from the female port.

The present invention is directed to a port connection assembly which allows to release a male connector from its installed position at the female port member and which allows to re-use the male connector after removal by plugging it into a female port member again. A disadvantage of the releasable port connection assemblies known so far is that a considerable force is needed when the male connector is inserted into the passageway of the female port member in order to displace the protrusion against its elastic bias so that the shoulder formed on the outer wall of the port connecting end of the male connector is able to pass the displaced protrusion. On the one hand a high elastic bias force of the protrusion is desired in order to achieve a reliable and secure lock by the protrusion when it has elastically returned behind the backside of the shoulder, on the other hand this makes the process of connecting the male connector to the female port member strenuous for the worker and may also lead to damages when too much force is applied.

It is an object of the present invention to provide a releasable port connection assembly which achieves a secure locking of the male connector in the port member on the one hand and which allows to carry out the connection of the male connector to the female port member with application of moderate force on the other hand.

This object is achieved by the releasable port connection assembly comprising the features of as claimed.

According to the present invention the elastically displaceable protrusion in the tubular passageway of the female port member is formed as a circumferentially extending inner rim of an elastically deformable split ring, i.e. a ring that is not closed but has a circumferential gap so that the split ring can be radially expanded when larger outer diameter portions of the male connector are pressed into the tubular passageway to pass by the split ring. This split ring is slidably received between sidewalls of a circumferential groove formed in an inner wall of the tubular passageway, so that, when the split ring is radially expanded, it can slide along the sidewalls deeper into the groove. According to the present invention the sidewalls of the groove are not oriented perpendicular to the axial direction of the tubular passageway, but are inclined with respect to the axial direction such that between the moving direction of the male connector when it is inserted into the tubular passageway and the moving direction of the split ring, when it is radially expanded by the male connector being pushed into the tubular passageway and moving deeper into the circumferential groove, an acute inclination angle is formed. In other words, the circumferential groove is not extending radially into the inner wall of the tubular passageway but is inclined such that it has a direction component in common with movement direction of the male connector when it is advancing in the tabular passageway. This orientation of the circumferential groove with respect to the moving direction of the male connector when it is inserted into the tubular passageway has the effect that the split ring is, when it is radially expanded by the male connector being pushed into tubular passageway, moving deeper into the inclined circumferential groove, and thereby, due to the acute angle between the moving direction of the split ring into the circumferential groove and the moving direction of the male connector, the split ring moves, besides its radial expansion, also in axial direction further into the tubular passageway. In other words, the split ring, when it is expanded by advancing male connector, has also a movement component in axial direction, namely in the same direction in which the male connector is moving when it is inserted into the tubular passageway.

This movement of the split ring axial direction with the advancing male connector causes a leverage effect in the following manner. Since the split ring is, while it is radially expanded, also moving to a certain extent with the male connector in its axial advancing direction the path length the male connector has to be advanced to complete the radial expansion of the split ring is enlarged compared to a situation in which the split ring would have to be expanded into a purely radially extending circumferential groove. Consequently the force needed to advance the male connector, to radially expand the split ring further into the inclined circumferential groove, per unit length of the male connector is advanced is lower because the complete radial expansion of the split ring takes place over a longer axial path length of male connector movement into the tubular passageway.

Accordingly, a worker can push the male connector with a rather moderate force into the tubular passage way of the female port member to its plug-in connection position. The force is the lower the smaller the acute inclination angle between the movement direction of the split ring in the circumferential groove and the movement direction of the male connector in axial direction into the tubular passageway is. On the other hand, the lower the acute inclination angle is, the longer is the movement distance the male connector has to be advanced to complete the radial expansion of the split ring.

In a preferred embodiment the split ring is provided with an inner circumferential surface that is tapering in the direction corresponding to the moving direction of the male connector when it is inserted into the tubular passageway. Preferably, the inner rim of the split ring is formed by an axial end portion of the tapering inner circumferential surface of the split ring.

In a preferred embodiment two axial end faces of the split ring which are in sliding contact with the sidewalls of the circumferential groove are inclined at the same inclination angle with respect to an axial direction of the split ring as the sidewalls of the circumferential groove are inclined with respect to the moving direction of the male connector when it is inserted into the tubular passageway of the female port member.

In a preferred embodiment the acute inclination angle of the circumferential groove with respect to the moving direction of the male connector when it is inserted is larger than 10°.

In a preferred embodiment the acute inclination angle of the circumferential groove sidewalls with respect to the moving direction of the male connector when it is inserted is smaller than 80°.

In a preferred embodiment the port connection end of the male connector is provided with a pre-sealing shoulder which is located in axial direction closer to a leading end of the port connection end of the male connector than the locking shoulder so that the pre-sealing shoulder is capable of coming into engagement with the inner rim of the split ring in the tubular passageway to hold the male connector in a coupled state with the female port member, wherein in this coupled state the port connection end of the male connector is not yet fully inserted into the tubular passageway of the female port member and has not yet reached a sealed state in the tubular passageway in contact with sealings in the tubular passageway. This allows to bring the male connector to a coupled state with the female port member before it is finally brought to the fully inserted and sealed plug-in position, wherein the coupled state the not yet fully sealed state of the connection can be sensed by a hissing noise when pressure is applied to the port connection assembly.

In a preferred embodiment a leading end face of the inner rim of the split ring is provided with a circumferential, radially outwardly extending recess configured to receive and engage with an edge portion of the pre-sealing shoulder or of the locking shoulder.

In a further aspect that present invention provides a combination of a releasable port connection assembly as described above and a release tool for releasing the male connector from the female port member. The release tool is an annular member with a circumferential gap that is larger than the outer diameter of the male connector so that it can be advanced towards the male connector to partially embrace it. The annular member has a cross-sectional profile defined by an annular inner wall portion and a radially outwardly shifted, surrounding outer wall portion which is connected to the inner wall portion by an upper wall portion. The inner and outer wall portions are dimensioned such that the release tool can be placed above the female port member around the male connector and can be lowered towards the female port member, wherein the outer diameter of the outer wall portion of the release tool allows to fit this outer wall portion around an upper end portion of the female port member, wherein the inner diameter of the inner wall portion is larger than the outer diameter of the male connector and its outer diameter is smaller than the opening of the tubular passageway such that, when the release tool is lowered onto the female port member, the inner wall portion presses against the split ring and expands it radially by urging it further into the circumferential groove to thereby disengage the inner rim of the split ring from the locking shoulder of the male connector, whereafter the male connector can be removed by lifting it up and away from the female port member.

BRIEF DESCRIPTION OF THE DRAWINGS

In the following an embodiment of the present invention will be described in more detail with reference to the drawings in which.

DETAILED DESCRIPTION

Figure 1:
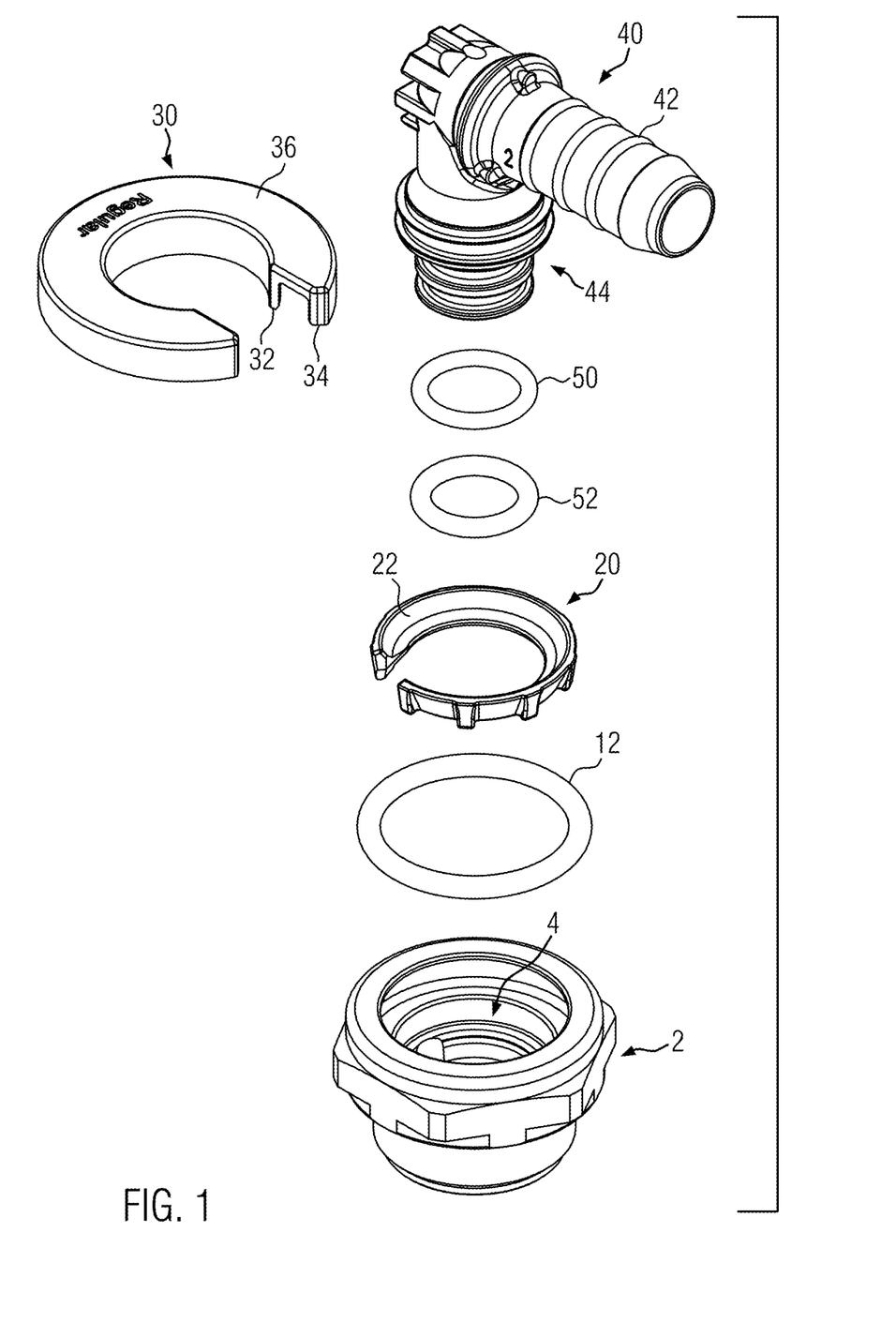
FIG. 1 shows an exploded view of a port connection assembly of the present invention together with a release tool.
Figure 2:
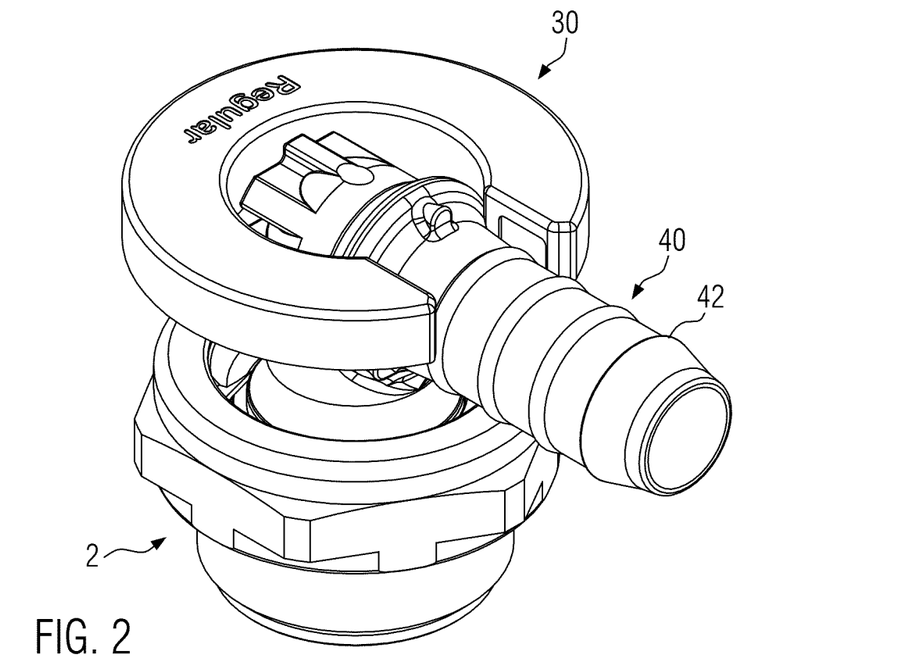
FIG. 2 shows a perspective view of the port connection assembly together with the release tool.
Figure 3:
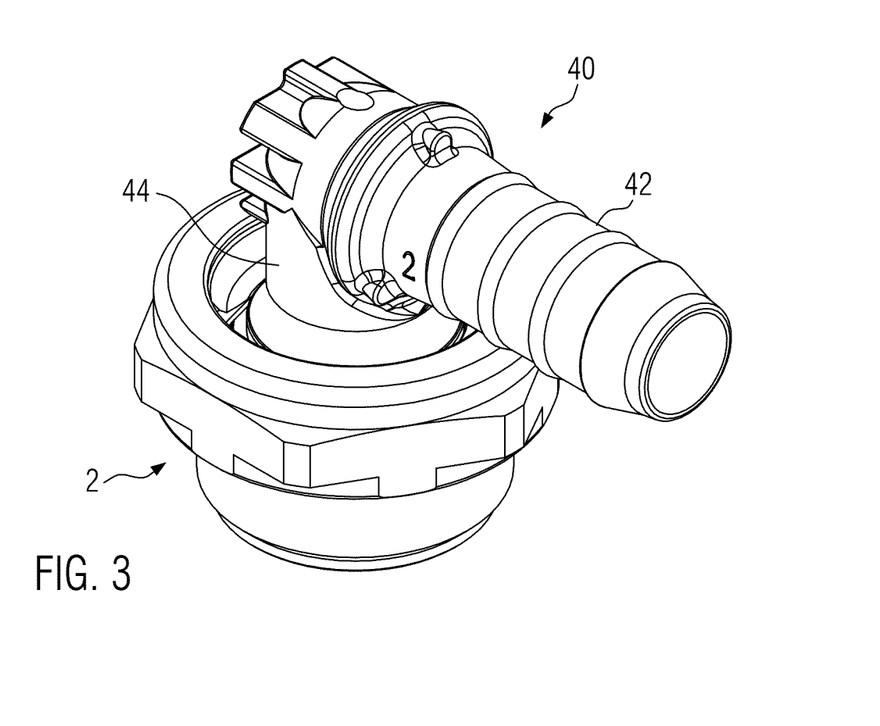
FIG. 3 shows a perspective view of the port connection assembly.

A first overview of the design of the port connection assembly of this embodiment will now be given with reference to FIGS. 1-3. FIG. 1 shows an exploded view of the port connection assembly together with a release tool 30. FIG. 3 shows a perspective view of the port connection assembly in a connected state, and FIG. 2 shows a corresponding perspective view in which the release tool 30 is placed above the port connection assembly where can be lowered onto the port connection assembly to release the plugin connection of a male connector 40 in a female port member 2 of the port connection assembly.

The port connection assembly comprises a female port member 2 which has a central tubular passageway 4 therethrough, and a male connector 40 to be connected to the female port member 2. The male connector 40 has a tube connection end 42 and at the opposite end a port connection end 44. In the illustrated embodiment the tube connection end 42 is oriented perpendicular to the conduit of the port connection end 44. However, this is only an exemplary embodiment, the tube connection end 42 could also be oriented at any other angle or be aligned and coaxial to the port connection end 44. In addition, in this embodiment the tube connection end 42 has a so-called "fir-tree" design with circumferential ridges which act as barbs to retain a tube that has been pushed onto the tube connection end 42. However, the fir-tree design of the tube connection end 42 is an example only, the tube connection end 42 could be designed in other ways to allow connection of a tube to the tube connection end 42, for example it could be designed as a plug-in connector into which a tube could be introduced to be retained therein by a grip ring, as described for example in WO 2016/041603 A1.

Figure 4:
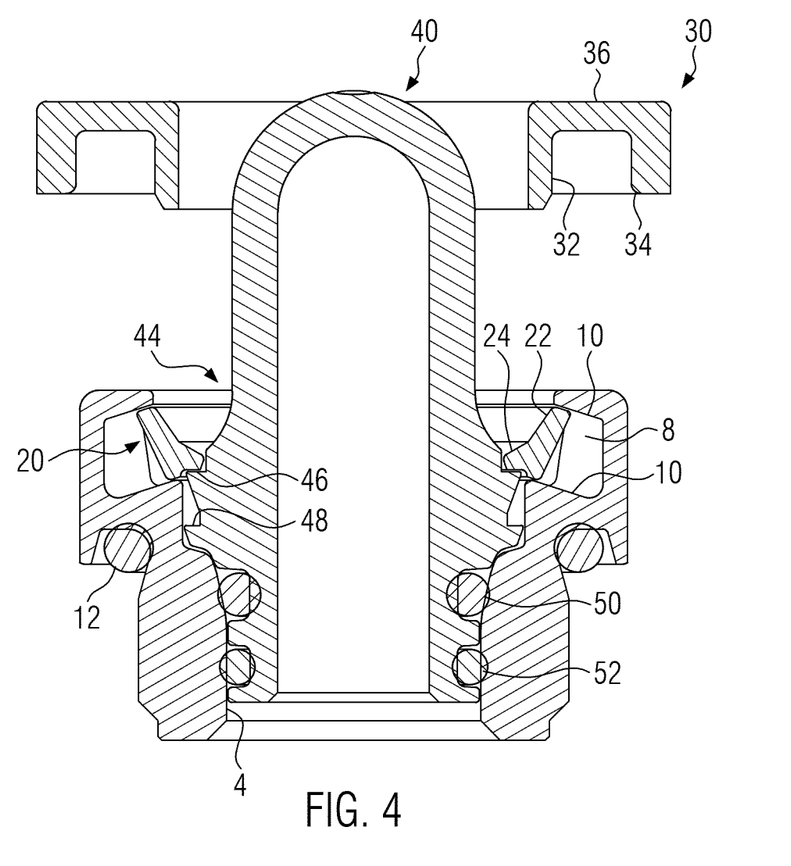
FIG. 4 shows a cross-sectional view of the port connection assembly together with the release tool.

As can be seen in FIG. 4 the tubular passageway 4 has a cylindrical portion and adjacent thereto an enlarged diameter portion for receiving enlarged diameter portions of the port connection end 44 of the male connector 40 as will be described further below. Close to the insertion opening of the tubular passageway 4 a circumferential groove 8 is formed in the inner wall of the tubular passageway as will be described in detail further below.

The port connection end 44 is configured to be inserted into the tubular passageway 4 of the female port member 2, and will now be described with reference to FIG. 4. At the end which is leading when the tube connection end 42 is inserted into the tubular passageway 4 of the female port member 2 two circumferential recesses are formed in the outer wall of the tube connection end 42 in which a second sealing ring 52 and a first sealing ring 50, respectively, are received. Along the port connection end 44 it follows a portion of increasing outer diameter which terminates in a pre-sealing shoulder 48. Further along the tube connection end 42 it follows again a region of increasing outer diameter which terminates in a radially extending locking shoulder 46. The pre-sealing shoulder 48 and the locking shoulder 46 are configured to cooperate with a split ring 20 to provide a plug-in connection of the male connector 40 in the female port member 2 as will be described further below.

The split ring 20 has a circumferential gap, as can be seen in the perspective view of FIG. 1 so that the split ring 20 can be elastically deformed by widening the circumferential gap when a member of larger outer diameter than the clear opening of the split ring 20 is pressing against the split ring. The split ring 20 can be made of metal or plastic material that allows the desired elastic opening or widening of the split ring.

Figure 5:
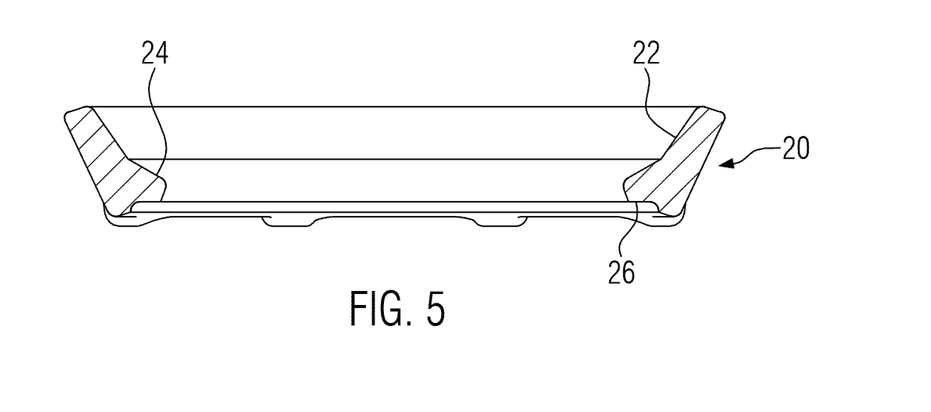
FIG. 5 shows a cross-sectional view of a split ring of the port connection assembly.

With reference to the cross-sectional view of FIG. 5 it can be seen that the split ring 20 is provided with an inner circumferential surface 22 that is tapering in the direction corresponding to the moving direction of the male connector 40 when it is inserted into the tubular passageway. At the inner end the tapering inner circumferential surface 22 terminates in an inner rim 24 of the split ring 20. At the end face of the split ring 20 the inner rim 24 is provided with a radially extending recess 26 which is configured to cooperate with the pre-sealing shoulder 48 and the locking shoulder 46 as will be described in the following.

With reference to the exploded view of FIG. 1 again, the port connection assembly further comprises a port sealing ring 12 which is configured to seal the female port member within an opening of a component (not shown) in which the female port member is mounted. The port connection assembly further comprises first and second sealing rings 50 and 52 which are carried by the port connection end 44 of the male connector 40 as will be described further below.

Figures 6A, 6B:
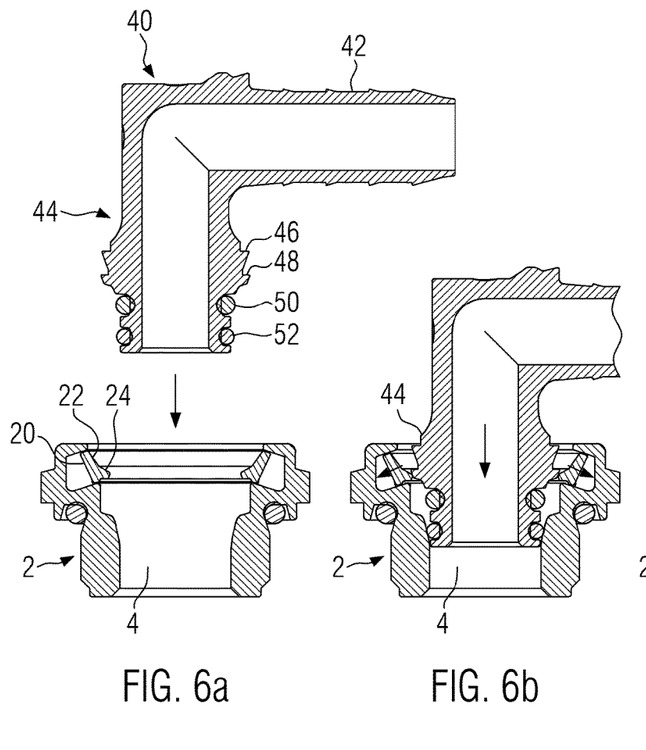
FIGS. 6a-6e show cross-sectional views of a female port member and a male connector in a sequence of steps when the male connector of the port connection assembly is introduced into the female port member of the port connection assembly to lock the male connector by a plug-in connection within the female port member.

In order to connect the male connector 40 to the female port member 2 the male connector 40 is lowered with its port connection end 44 towards the insertion opening of the tubular passageway 4 of the female port member 2, as can be seen in FIG. 6a. Once the second and first sealing rings 52, 50 have passed the split ring 20 the following region of increasing outer diameter of the port connection end 44 starts to act on the tapering inner circumferential surface 22 and on the inner rim 24 of the split ring 20, thereby expanding the split ring 20 and urging it further to move deeper into the circumferential groove 8.

Figure 6C:
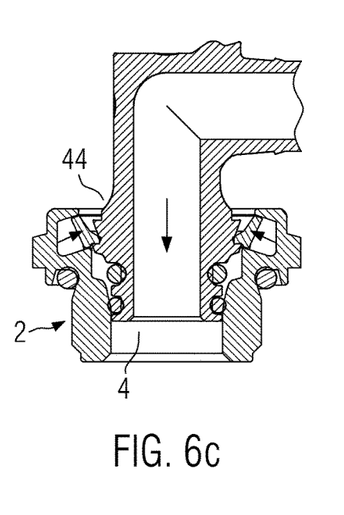

The split ring 20 is received in circumferential groove 8 between the sidewalls 10 of the circumferential groove 8. When the increasing outer diameter portions of the port connection end 44 act on the inner rim 24 of the split ring 20 the force exerted by the advancing tube connection end 42 causes a radial expansion of the split ring 20 which is thereby urged to slide further and deeper into the circumferential groove 8, as is indicated in FIG. 6b by two arrows passing through the split ring 20 and pointing outwards which is intended to illustrate the movement direction of the split ring portions during the radial expansion. As can be seen in FIG. 6b the movement direction of the circumferential split ring 20 in the circumferential groove 20 is, due to the inclination of the sidewalls 10 of the circumferential groove 8 oriented at an acute angle with respect to the moving direction of the tube connection end 42 when it is inserted, i.e. at an angle that is lower than 90°. For this reason the split ring 20, when it is radially expanded by the advancing tube connection end 42 urging the split ring 20 deeper into inclined circumferential groove 8, has besides a radial moving component also an axial moving component in the same direction as the moving direction of the advancing tube connection end 42, wherein this axial movement component of the split ring 20 provides for the leverage effect as explained above which results in a lower force needed to radially expand the split ring compared to a situation in which a pure radial expansion would be carried out. Once the inner end of the inner rim 24 of the split ring 20 has reached the radially extending pre-sealing shoulder 48 (see also FIG. 4) the split ring elastically returns to a lower inner diameter as allowed by the pre-sealing shoulder 48. This elastically return movement of the split ring 20 is indicated in FIG. 6c by two inclined, inwardly directed arrows. With this movement the split ring 20 engages with the pre-sealing shoulder 48 by receiving the pre-sealing shoulder 48 in the radial recess 26 (see FIG. 5) of the split ring 20. After this engagement the tube connection end 42 of the male connector 40 is already coupled to the female port member 2, but not yet in the fully inserted and sealed locking position.

Figure 6D:
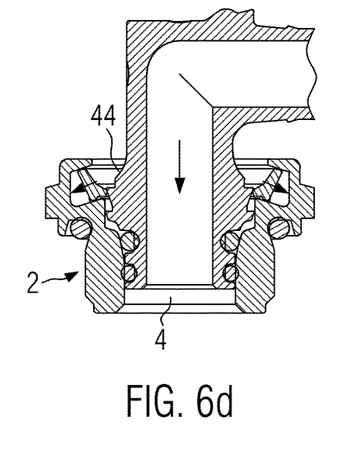
Figure 6E:
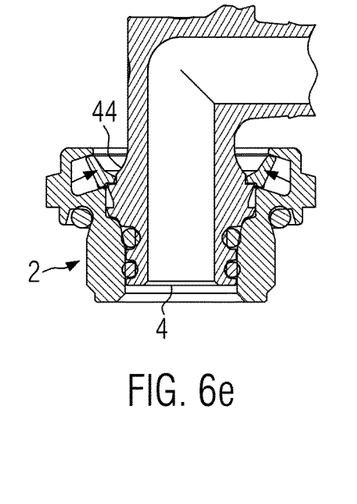

To continue the connection process force is continued to be exerted on the male connector 40 to move it deeper into the tubular passageway 4 of the female port member 2. In the course of this movement increasing outer diameter portions of the outer surface of the port connection end 44 are acting on the inner rim 24 of the split ring 20 to radially expand it again by urging it deeper into the inclined circumferential recess 8, wherein this movement is indicated in FIG. 6d by the two arrows directed into the circumferential groove. Again, the movement direction of the split ring indicated by the arrows is at an acute angle with respect to the (vertical) movement direction of the male connector 40 when it is pushed further into the tubular passageway of the female port member. Once the inner end of the inner rim 24 of the split ring 20 reaches the axial position of the radially extending locking shoulder 46 (see FIG. 4) the split ring 20 is free to elastically return to a smaller diameter, thereby engaging the locking shoulder 46 by receiving it in the radially extending recess 26 (see FIG. 5) of the split ring 20. This return movement of the split ring to the engaged position with the locking shoulder 46 is indicated in FIG. 6e by the two opposite arrows indicating the returning movement of the split ring to a smaller diameter. In this fully inserted locking position of the male connector 40, which is also shown in FIG. 4, the port connection end 44 of the male connector 40 is locked inside the tubular passageway of the female port member 2 by engagement of the split ring 20 with the locking shoulder 46 of the port connection end 44 of the male connector 40. In this locked state of the male connector 40 the male connector 40 is sealed by the first and second sealing rings 50 and 52 in the tubular passage of the female port member 2.

In the following it will be described how a male connector 40, when it is locked in the female port member 2 as shown in FIG. 4, can be released again to remove it from the female port member. For this purpose a release tool 30 is used which has, as can be seen in the perspective view of FIG. 1, a circumferential gap, which circumferential gap allows it to advance the release tool 30 over the male connector 40 so that the release tool 36 partially embraces an upper end region of the port connection end 44 when the male connector 40 is locked in the female port member 2, as can be seen in FIG. 2. With reference to FIG. 4, the release tool 30 has a cross-sectional profile including an inner wall portion 32 and at a larger radius an outer wall portion 34, which inner and outer wall portions 32 and 34 are connected by an upper wall portion 36 wherein these wall portions may be portions of an integral release tool member 30. As can be seen in FIG. 4 the inner wall portion 32 and the outer wall portion 34 are dimensioned in the following manner. The inner diameter of the outer wall portion 34 is larger than the outer diameter of an upper end region of the female port member 2. The outer diameter of the inner wall portion 32 is smaller than the inner diameter of the clear opening of the tubular passageway 4 of the female port member. These dimensions of the release tool 30 allow to lower the release tool 30 onto the female port member, wherein the outer wall portion 34 can be pushed onto the upper end region of the female port member 2, wherein in the course of this lowering movement the inner wall portion 32 enters the insertion opening of the tubular passageway 4 of the female port member 2 to act on the split ring 22 as will be described now with respect to the release procedure illustrated in FIGS. 7a-7d.

Figure 7A:
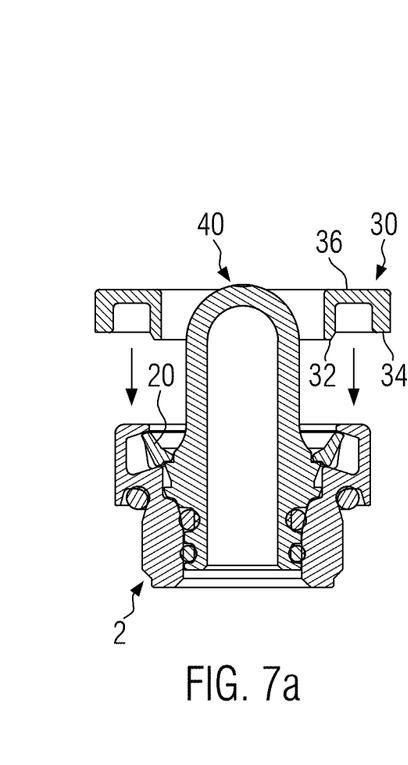
FIGS. 7a-7d show cross-sectional views of the port connector assembly and the release tool in a sequence of steps when the plug-in connection of the male connector within the female port member is released using the release tool and the male connector is removed from the female port member.
Figure 7B:
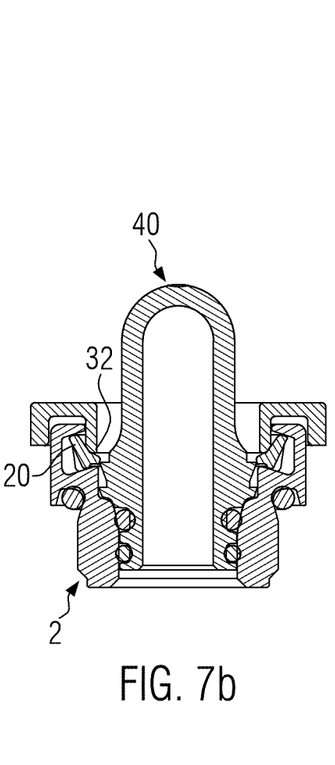
Figure 7C:
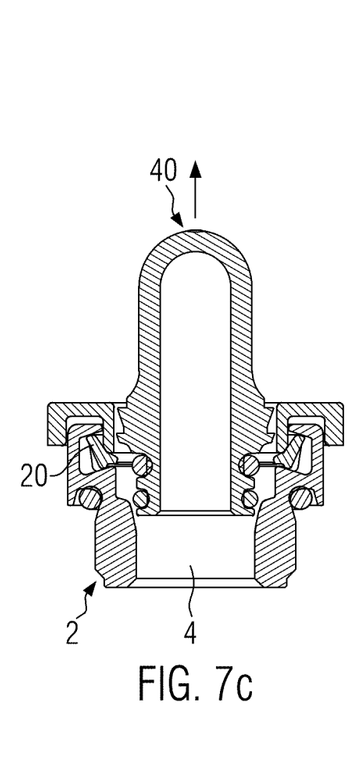
Figure 7D:
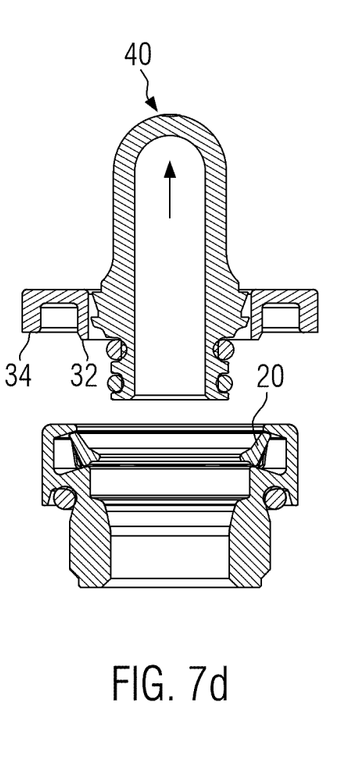

In FIG. 7a the male connector 40 is in the locked state in the female port member 2, and the release tool 30 is being lowered onto the female port member as indicated in FIG. 7a. In FIG. 7b the outer wall portion 34 is embracing the upper end region of the female port member 2, whereas the inner wall portion 32 has entered the insertion opening of the tubular passageway of the female port member 2 and has contacted the inner rim 24 of the split ring 20, thereby radially expanding split ring 20 and urging it further into the circumferential groove 8. In the state of FIG. 7b the split ring 20 has already been expanded and urged into the circumferential groove 8 to a sufficient extent such that the inner rim 24 of the split ring 20 has cleared the locking shoulder 46 so that the locking shoulder and the pre-sealing shoulder may pass by the radially expanded split ring 20, which is still kept in the radially expanded state by the inner wall portion 34 of the release tool 30, as indicated in FIG. 7c. In FIG. 7c withdrawing of the male connector 40 from the female port member 2 has already started. When the male connector 40 has been lifted off the female port member 2, the release tool 30 can also be lifted up, whereafter the split ring 20 elastically returns to a smaller diameter state in which the inner rim 24 of the split ring 20 forms a protrusion extending radially into the tubular passageway of the female port member 2.

If needed the male connector 40 can be connected to the female port member 2 again with the procedure as described above and as illustrated in FIGS. 6a-6e.

The invention claimed is:

1. A releasable port connection assembly comprising:
   a female port member (2) having a tubular passageway (4) extending in an axial direction
   a male connector (40) having a tube connection end (42) and a port connection end (44),
      the tube connection end (42) being configured for connection to a tube, and
      the port connection end (44) being configured to be received and retained in the tubular passageway (4) by a retaining pawl arrangement comprising an elastically displaceable protrusion extending radially inwardly in the tubular passageway and configured to engage an outwardly projecting locking shoulder (46) on the port connection end (44) of the male connector (40) once the male connector has been inserted into the tubular passageway and the locking shoulder (46) has passed the protrusion,
   characterized in that the protrusion is formed as a circumferentially extending inner rim (24) of an elastically deformable split ring (20) which is slidably received between sidewalls (10) of a circumferential groove (8) formed in an inner wall of the tubular passageway (4), wherein the split ring (20) is split to define a circumferential gap and is configured to elastically deform and radially expand to widen the circumferential gap,
   wherein the sidewalls (10) of the groove are inclined with respect to the axial direction such that between the moving direction of the male connector (40) when the male connector (40) is inserted into the tubular passageway and the expansion moving direction of the split ring (20), when the split ring (20) is radially expanded by the male connector being pushed into the tubular passageway and moving deeper into the circumferential groove (8), an acute inclination angle is formed, whereby the split ring (20), when being expanded radially, also moves in the axial moving direction of the male connector when the male connector (40) is advanced deeper into the tubular passageway.

2. The releasable port connection assembly according to claim 1, characterized in that the split ring (20) is provided with an inner circumferential surface (22) that is tapering in the direction corresponding to the moving direction of the male connector (40) when the male connector (40) is inserted into the tubular passageway.

3. The releasable port connection assembly according to claim 2, characterized in that the inner rim (24) is formed by an axial end portion of the inner circumferential surface (22).

4. The releasable port connection assembly according to claim 1, characterized in that two axial end faces of the split ring which are in sliding contact with the sidewalls (10) of the circumferential groove (8) are inclined at the same acute angle, with respect to an axial direction of the split ring (20), as the sidewalls (10) are inclined with respect to the moving direction of the male connector (40) when the male connector (40) is inserted into the tubular passageway (4) of the female port member (2).

5. The releasable port connection assembly according to claim 1, characterized in that the acute inclination angle of the circumferential groove sidewalls with respect to the moving direction of the male connector (40) when the male connector (40) is inserted is larger than 10°.

6. The releasable port connection assembly according to claim 1, characterized in that the acute inclination angle of the circumferential groove sidewalls with respect to the moving direction of the male connector (40) when the male connector (40) is inserted is smaller than 80°.

7. The releasable port connection assembly according to claim 1, characterized in that the port connection end (44) of the male connecter (40) is provided with a pre-sealing shoulder (48) which is located in axial direction closer to a leading end of the port connection end (44) of the male connector (40) than the locking shoulder (46) so that the pre-scaling shoulder (48) is capable of coming into engagement with the inner rim (24) of the split ring (20) in the tubular passageway to hold the male connector (40) in a coupled state with the female port member (2), wherein in this coupled state the port connection end (44) of the male connector (40) is not yet fully inserted into the tubular passageway of the female port member (2) and has not yet reached a completely sealed state in the tubular passageway (4).

8. The releasable port connection assembly according to claim 1, characterized in that a leading end face of the inner rim (24) of the split ring (20) is provided with a circumferential, radially outwardly extending recess (26) configured to receive and engage with an edge portion of the pre-scaling shoulder (48) or of the locking shoulder (46).

9. A combination of a releasable port connection assembly according to claim 1 and a release tool (30) for releasing the male connector (40) from the female port member (2), characterized in that the release tool (30) is an annular member with a second circumferential gap that is larger than the outer diameter of the port connecting end (44) of the male connector, and in that the annular member has a cross-sectional profile defined by an annular inner wall portion (32) and a surrounding annular outer wall portion (34) which is connected to the inner wall portion (32) by an upper wall portion (36), wherein the inner and outer wall portions (32, 34) are dimensioned such that the release tool (30) can be placed above the female port member (2) around the plugged-in male connector (40) and be lowered towards the female port member (2), wherein the inner diameter of the outer wall portion (34) of the release tool (30) allows the release tool (30) to fit around an upper end portion of the female port member (2), wherein the outer diameter of the inner wall portion (32) is larger than the outer diameter of the male connector (40) but smaller than the clear opening of the tubular passageway (4) such that, when the release tool (30) is lowered onto the female port member (2), the inner wall portion (32) presses against the split ring (20) and expands the split ring (20) by urging the split ring (20) further into the circumferential groove (8) to thereby disengage the inner rim (24) of the split ring (20) from the locking shoulder (46) of the male connector (40).

\* \* \* \* \*